(12) United States Patent
Erb

(10) Patent No.: US 6,778,641 B2
(45) Date of Patent: Aug. 17, 2004

(54) TELEPHONE INDEPENDENT PROVISION OF SPEECH RECOGNITION DURING DIAL TONE AND SUBSEQUENT CALL PROGRESS STATES

(75) Inventor: Paul Andrew Erb, Ottawa (CA)

(73) Assignee: Mitel Knowledge Corporation (CA)

( * ) Notice: Subject to any disclaimer, the term of this patent is extended or adjusted under 35 U.S.C. 154(b) by 102 days.

(21) Appl. No.: 09/952,795

(22) Filed: Sep. 13, 2001

(65) Prior Publication Data

US 2002/0051523 A1 May 2, 2002

(30) Foreign Application Priority Data

Sep. 13, 2000 (GB) .............................................. 0022410

(51) Int. Cl.[7] .............................................. H04M 1/64
(52) U.S. Cl. .............................. 379/88.01; 379/207.04; 709/270.1
(58) Field of Search .......................... 379/88.01–88.04, 379/201.01–201.03, 207.02, 207.04–207.1; 709/231, 246, 251, 270, 270.1, 275

(56) References Cited

U.S. PATENT DOCUMENTS

| | | | |
|---|---|---|---|
| 4,763,350 A | | 8/1988 | Immedorfer et al. |
| 5,165,095 A | * | 11/1992 | Borcherding ............ 379/88.03 |
| 5,566,229 A | * | 10/1996 | Hou et al. ................ 379/88.02 |
| 5,668,854 A | * | 9/1997 | Minakami et al. ....... 379/88.18 |
| 5,719,921 A | * | 2/1998 | Vysotsky et al. ........ 379/88.01 |
| 5,991,364 A | * | 11/1999 | McAllister et al. ...... 379/88.01 |
| 5,999,611 A | | 12/1999 | Tatchell et al. |
| 6,038,305 A | * | 3/2000 | McAllister et al. .... 379/201.02 |
| 6,167,119 A | * | 12/2000 | Bartholomew et al. .. 379/88.04 |

FOREIGN PATENT DOCUMENTS

| | | |
|---|---|---|
| EP | 0529948 | 8/1992 |
| EP | 0 928 094 | 7/1999 |

OTHER PUBLICATIONS

Merriam Webster's Collegiate Dictionary, 10th Ed., 1997, ISBN 0–87779–709–9, pp. 30 and 1146.*

* cited by examiner

Primary Examiner—Roland G. Foster
(74) Attorney, Agent, or Firm—Jones Day

(57) ABSTRACT

A communication system utilizing speech control of operations, comprising a plurality of telephone devices, at least one Speech Recognition Engine (SRE) for providing indications of speech from spoken voice at the telephone devices, and a call control for controlling operation of the telephone devices in accordance with predetermined call states, and for dynamically allocating and de-allocating the SRE in response to the predetermined call states, whereby the SRE provides indications to the call control for initiating changes in the call states.

8 Claims, 1 Drawing Sheet

TELEPHONE INDEPENDENT PROVISION OF SPEECH RECOGNITION DURING DIAL TONE AND SUBSEQUENT CALL PROGRESS STATES

FIELD OF THE INVENTION

The present invention relates generally to telephone systems, and in particular to a method and apparatus for automatically providing speech recognition resources to a user upon initiating a call and during subsequent call states.

BACKGROUND OF THE INVENTION

As speech recognition applications become more integrated with traditional PBX functionality, the provisioning of speech recognition has become fundamental to improving users' telephone experiences. In order to utilize speech recognition resources in current PBX systems, the user is required to dial the speech recognition application, or Speech Recognition Engine (SRE) resource, from an idle telephone device. It is not currently possible to merely go off-hook and speak the name of the party in order to connect to the SRE resource. Nor is it currently possible to invoke the SRE resource after it has been de-allocated by, for example, speaking another party's name to call, when the user receives a busy signal or there is no answer to the initial call attempt.

Currently, there are two methods to associate an SRE resource to service a user request (used either individually or in conjunction), as follows:
1) Require the user to dial a number, at the user's telephone device, in order to connect the SRE explicitly. This can be accomplished by configuring a hunt group of SRE resources (typically, a number of ports configured on system installation). The associated telephone number can be provided to the user, or can be represented by an alternative dialing sequence, which delivers the call to the hunt group (i.e. system speed-dial of 411). Optimally, a single button is provided on the telephone to initiate the call. For example, Mitel Corp. includes a button labeled Speak@Ease on its display sets. Regardless of how the SRE resource is provisioned, this method always requires the user to take a specific action prior to using the SRE resource.
2) Provide a hotline connection at the user's telephone device, in order to connect the SRE implicitly. The user simply goes off-hook and the SRE is connected automatically. This can be accomplished by configuring a hunt group of SRE resources (as in method 1, above) and configuring the user's telephone device as a hotline to the associated telephone number. This can also be accomplished by associating a system attribute with the user's device which initiates the connection to an SRE resource upon on going off-hook. This method does not require the user to take a specific action prior to using the SRE resource, however, system configuration is required on behalf of the user.

In both methods described above, the SRE resource is not available if a user remains off-hook after an initial call is initiated and the SRE resource has been disconnected. The user must end the call, or place the call on bold, and explicitly dial the SRE resource (e.g. actuate the Speak@Ease button when an SRE resource is desired).

SUMMARY OF THE INVENTION

According to one aspect of the present invention there is provided a telephone system having a plurality of telephone devices connected to a call control, and at least one Speech Recognition Engine (SRE) resource also connected to the call control. In operation, the call control allocates the SRE resource upon initiation of a call without requiring specific user action or system configuration on behalf of the user. Call control releases the SRE resource once a valid destination number is recognized (in the case where the SRE incorporates a DTMF receiver function (as is known in the art)) or after the first valid DTMF tone is received (where the SRE and DTMF receiver are separate). Subsequently, a further SRE resource may be allocated during the call in response to call progress information. The call context as maintained by PBX call control, is used to act on directives as recognized by the SRE resource and provide the user with context specific responses, as appropriate.

The SRE resource is available to all telephone devices connected to the PBX, including any device that requires connection to the SRE on behalf of a user (e.g. a headset or speakerphone operating in hands free mode, PC phone, etc.)

BRIEF DESCRIPTION OF THE DRAWINGS

A preferred embodiment of the present invention will now be described more fully with reference to FIG. 1, which is a block diagram of the telephone system according to the present invention.

DETAILED DESCRIPTION OF THE PREFERRED EMBODIMENT

Figure 1:
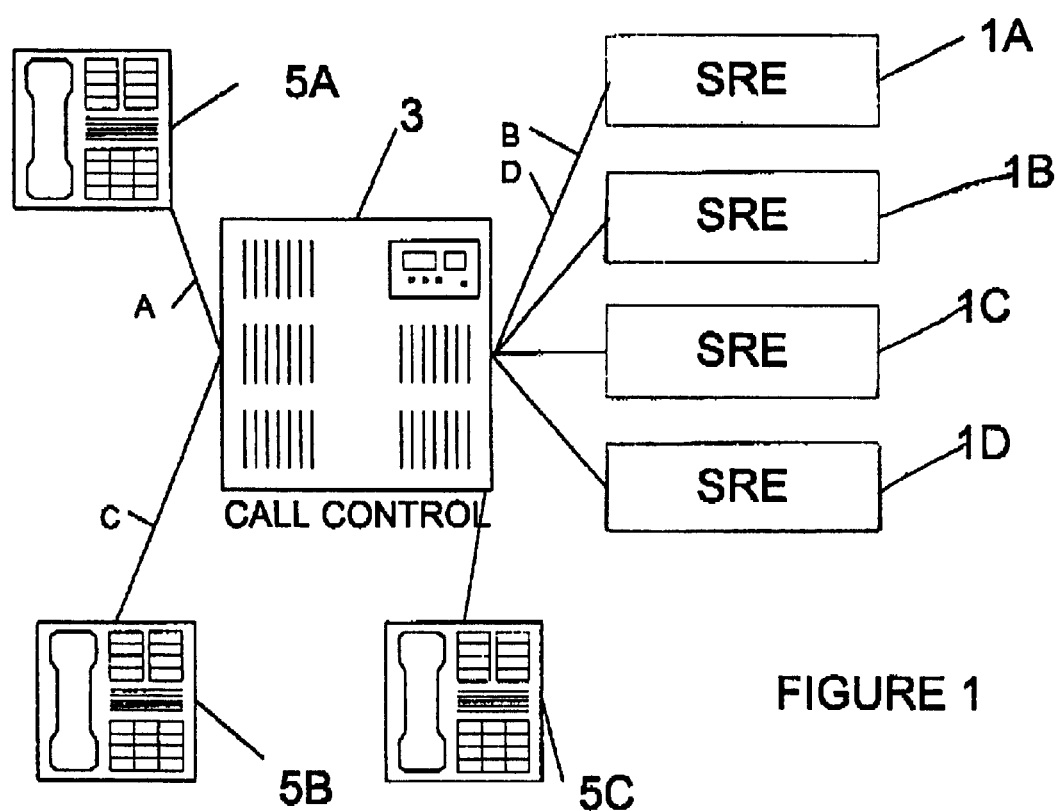

With reference to FIG. 1, a plurality of speech recognition resources, referred to herein as Speech Recognition Engine resources, SRE, resources 1A, 1B, etc., are configured within a PBX. The term "SRE" as used herein refers to the Mitel Speech Recognition Engine (commercially identified as SpeakEasy or Speak@Ease), which is known in the art for providing speech recognition enhanced telephone directory services. In contrast with prior art systems, the SRE resources 1A, 1B etc. are not placed in a hunt group or made explicitly accessible to users. The SRE resources 1A, 1B, etc. are available only to call control 3, and are allocated and released dynamically as determined by call control 3. A plurality of telephone devices 5A, 5B, etc. are logically connected to the PBX call control 3 in a well-known manner.

In response to a user causing a telephone device (e.g. telephone 5A) initially to go off-hook, call control 3 updates the call context to an origination state and allocates a DTMF receiver (not shown) to the call. Similarly, call control 3 allocates an SRE resource (e.g. SRE 1A) to the call and establishes a bi-directional connection to the telephone device 5A. The DTMF receiver may be provided in parallel with the SRE 1A, "in- line" with the SRE 1A, or integrated with the SRE 1A. Preferably, the DTMF receiver is integrated within the SRE resources. Hence, the DTMF receiver is not explicitly illustrated in FIG. 1.

In the above example, the term "off-hook" refers to the picking up of a handset. However, the principles of this invention apply regardless of the mechanism by which a communication session is initiated from a telephone device (e.g. hands free mode using a headset or speaker on the telephone device, or a user input action on a PC based telephone device).

The connection of SRE 1A to the telephone 5A as set forth above differs from the prior art (i.e. the use of a hotline) in that the SRE is allocated to the call as an auxiliary resource prior to establishing the call (similar to the well known method of associating a DTMF receiver to a call).

When the first DTMF digit is received by the DTMF receiver, an appropriate indication is sent to call control 3.

Call control removes dial tone and prepares to receive the destination digits as collected by the DTMF receiver. The DTMF receiver then recognizes and provides DTMF digits to call control 3. Preferable, as indicated above, the SRE 1A includes an integrated DTMF receiver, such that the allocated SRE proceeds to recognize and provide the DTMF digits to call control 3.

If a valid destination is determined and the call proceeds, ring back is applied and the SRE 1A is released. If the destination is not valid or the call cannot proceed, an appropriate tone is returned to the telephone device 5A under direction of call control 3. In the event that the SRE 1A detects voice, an indication is provided to call control 3. Call control then removes the applied tone and prepares to receive destination digits, as discussed above.

The connection to the SRE 1A is released when the origination state is exited (i.e. the call is progressing to seize the specified destination). Thus, where the DTMF receiver is separate from the SRE, the SRE 1A is released upon receipt of the first DTMF digit by the DTMF receiver. Otherwise, if the DTMF function is integrated into the SRE 1A, the SRE is released once a valid destination has been identified by call control 3.

In addition to allocating SRE resources in the call origination state, the invention provides for allocating SRE resources to calls under other appropriate conditions. The allocation is performed when an appropriate time out occurs or a specific call state is entered, including but not limited to: busy, ring no answer, out of service, do not disturb, etc. The allocated SRE is subsequently released when the call state changes. In one implementation, call control 3 is modified to allocate an SRE when entering appropriate states and de-allocate the SRE when the state is exited (i.e. the states are hard coded into the call control software). Alternatively, a table may be provided in call control memory containing all call control states, with True or False indicating SRE allocation on entry and True or False for SRE de-allocation on exit of each state.

| e.g. State | Allocate SRE on Entry | De-allocate SRE on Exit |
|---|---|---|
| Origination | True | True |
| Ringing | False | False |
| Busy | True | True |

This table may also be configured for site specific SRE allocation support.

The call context is maintained by call control 3 (i.e. call processing reflects the state of the call) and is provided to the SRE resource via a directive when the SRE is allocated. The SRE is configured, also using a table, with associated key word dictionaries and key word responses files. The key word dictionary and key word responses files are used by the SRE resource to supplement traditional speech recognition with PBX specific requests and responses. For each key word recognized, the key word responses file includes a message to be played, if applicable, and an indication of whether the "name" (as previously recognized) is to be repeated.

| e.g. State | Key Word Dictionary | Key Word Responses |
|---|---|---|
| Origination | Origination.kwd | Origination.kwd |
| Ringing | NULL | NULL |
| Busy | Busy.kwd | Busy.kwd |

The principal benefit of using an SRE with integrated DTMF detection is the ability to provide a Dial over Tone feature wherein the user may dial a desired destination during any call state in which the SRE resource is allocated. Hence, the user may speak another name to reach a destination, dial an extension (if DTMF detection is provided by the SRE resource), or give directives to call control 3 (e.g. camp on/wait, call back/notify, override/intrude, etc.). Each of these options is available whenever a call attempt fails to or actually reaches an appropriate call state.

For example, if user Geoff Smith wishes to call Peter Perry to discuss an upcoming sports event as he is leaving his office, Geoff lifts the handset of a telephone 5A (e.g. a telephone set in the lobby of the office building in which Geoff Smith works). "Peter Perry", he says, without bothering to dial 411 (traditionally used to connect an SRE). After a moment, the allocated SRE resource (e.g. SRE 1A) repeats the name back and says "Dialing". If it is after hours, Geoff continues to hear ring-back as the call is forwarded to Peter's secretary. "Peter Perry at home," Geoff adds, not wishing to be transferred to Peter's voicemail. Recognizing the new qualifier, the SRE 1A responds, "Peter Perry at home. Dialing". Several moments later, the telephone at the other end is answered by Peter Perry. During their conversation, it is decided to get the opinion of an authority on the subject. Geoff puts the call on hold and says "Jim Davies". Hearing busy tone, Geoff then says, "Wait". Recognizing the request, the SRE resource responds with, "Waiting". Wanting to speak further with Peter while he waits, Geoff requests "Conference" and the Speech recognition application responds, "Conferencing". When Jim hangs up, his telephone rings and, answering, he is connected to both Geoff and Peter. They converse together until Geoff hangs up, thereby clearing the call.

In the above example, call control 3 initially connects a duplex speech path and allocates an SRE 1A to the call initiated by Geoff Smith at telephone device 5A (indicated in FIG. 1 by the action "B") as soon as Geoff lifts the handset (indicated in FIG. 1 by the action "A"). When the SRE recognizes voice, it sends a directive to call control 3 to break the dial tone (as is traditionally done when a DTMF receiver detects the first digit). The SRE 1A then collects and recognizes the name "Peter Perry" and passes the destination digits for Peter Perry to call control 3 which, in response directs the call to telephone 5B (indicated in FIG. 1 by action C). The SRE 1A is released when the call is successfully initiated to the telephone device of Peter Perry (indicated in FIG. 1 by action D). After an associated ring no answer timer expires within call control 3, an SRE 1B is again allocated (not necessarily the same SRE 1A as was originally allocated). When the SRE 1B recognizes "Peter Perry at home", it repeats back the "name" and says "dialing". Again, the SRE 1B passes the request to call control 3 and is, subsequently, released when the new call is initiated. When the call is placed on hold, an SRE 1C is allocated (or any non-allocated SRE). The SRE 1C recognizes requests issued by Geoff to initiate a new call to Jim Davies, invoke the camp-on feature, and establish a conference call. When the conference call is established, the SRE 1C is released. No SRE resource is allocated for the remainder of the call.

The basic PBX implementation of FIG. 1 is greatly simplified, for ease of explaining the principles of the invention. However, in practice, the communication systems for implementing the present invention are substantially more complex. Nonetheless, the basic principles of the invention apply to such complex implementations. For example, when an inter-PBX signaling protocol is used (e.g. DPNSS), the SRE resource provided at the PBX in a network may be made available to any telephone device across the entire network. End-to-end connection delay can be eliminated by establishing a group of SRE resource connections to the remote PBX on system initialization. The connections to the remote PBX are then maintained regardless of the SRE resource allocations. Additional, SRE resource connections to the remote PBX are established or dropped when the group utilization exceeds specific thresholds.

Alternatives and variations of the invention are possible. Although the present invention has been described in terms of simple call processing applications within a PBX, it is contemplated that the invention may be applied generally to any application where voice recognition is provided in a telephony system. For example, the invention may be applied to a Call Center and/or Interactive Voice Response (IVR) application where a user is prompted for information and speech recognition is used to obtain caller responses. The invention is equally applicable to voice applications in the CO domain and in mixed media communications where SRE resources are used to provide periodic services. All such embodiments and modifications are believed to be within the sphere and scope of the invention as defined by the claims appended hereto.

What is claimed is:

1. A communication system utilizing speech control of operations, comprising:
    a plurality of telephone devices;
    a plurality of Speech Recognition Engine (SRE) resources for providing indications of speech from spoken voice at said telephone devices; and
    a call control for controlling operation of said telephone devices in accordance with predetermined call states by automatically allocating one of said SRE resources in response to one of said telephone devices initiating a call origination state, de-allocating said one of said SRE resources in response to initiation of a change from said origination state to a further predetermined call state and dynamically allocating and de-allocating one or more of said one or further ones of said SRE resources in response to additional changes in said predetermined call states, whereby said SRE resources provide said indications to said call control for initiating changes in said call states.

2. The communication system of claim 1, further including memory within said call control for storing a table containing all said call states and respective indications for one of either allocating or de-allocating said SRE resources.

3. The communication system of claim 1, further including memory within said SRE resources for storing a table containing all said call states and associated key word dictionaries and key word responses files to facilitate play back of a voice message from the key word responses for each recognized key word in said key word dictionaries associated with said call states.

4. The communication system of claim 1, 2 or 3, wherein said plurality of telephone devices include at least one of a telephone set, headset or speakerphone operating in hands free mode, or a PC phone.

5. The communication system of claim 1, 2 or 3, wherein each of said SRE resources include an integrated DTMF receiver for providing to said call control indications of DTMF digits dialed at said plurality of telephone devices.

6. A method of controlling operation of a plurality of telephone devices according to predetermined call states, comprising the steps of:
    automatically allocating a first one of a plurality of Speech Recognition Engine (SRE) resources to a first one of said telephone devices in response to said first one of said telephone devices initiating a call origination state, whereupon said first one of said SRE resources provides indications of speech from spoken voice at said first one of said telephone devices;
    receiving said indications of speech from said first one of said SRE resources and in response initiating a change from said origination state to at least one further predetermined call state;
    de-allocating said first one of said SRE resources in response to said change to said at least one further predetermined call state; and
    dynamically allocating and de-allocating one or more of said first or further ones of said plurality of SRE resources in response to additional changes in said predetermined call states, whereby said SRE resources provide further indications of speech for initiating further changes in said call states.

7. The method of claim 6, wherein said changes in said call states are prescribed by a truth table containing all said call states and respective indications for one of either allocating or de-allocating said SRE resources.

8. The method of claim 6, wherein said steps of dynamically allocating and de-allocating and de-allocating one or more of said first or further ones of said plurality of SRE resources, includes dynamically allocating a further one of said plurality of SRE resources.

* * * * *